United States Patent

Nishino et al.

[11] Patent Number: 5,832,834
[45] Date of Patent: Nov. 10, 1998

[54] ALUMINUM SUPPORT FOR LITHOGRAPHIC PRINTING PLATE

[75] Inventors: Atsuo Nishino; Kiyotaka Fukino; Akio Uesugi, all of Shizuoka, Japan

[73] Assignee: Fuji Photo Film Co., Ltd., Minami-ashigara, Japan

[21] Appl. No.: 888,058

[22] Filed: Jul. 3, 1997

[30] Foreign Application Priority Data

Jul. 5, 1996 [JP] Japan .................................. 8-176586

[51] Int. Cl.⁶ .............................. B41N 1/08; C25D 11/04
[52] U.S. Cl. .......................... 101/459; 205/127; 205/214; 205/324; 428/687
[58] Field of Search .................................. 101/454, 458, 101/459; 205/106, 127, 213, 214, 323, 324, 658; 428/472.2, 687

[56] References Cited

FOREIGN PATENT DOCUMENTS

| 0701908 | 3/1996 | European Pat. Off. . |
| 0730979 | 9/1996 | European Pat. Off. . |
| 8-58256 | 3/1996 | Japan . |
| 2019022 | 10/1979 | United Kingdom . |

OTHER PUBLICATIONS

Patent Abstracts of Japan, vol. 096, No. 007, Jul. 31, 1996 & JP 08058256 A (Mitsubishi Chem. Corp.; Konica Corp.) *abstract*.

*Primary Examiner*—Stephen R. Funk
*Attorney, Agent, or Firm*—Burns, Doane, Swecker & Mathis, LLP

[57] ABSTRACT

An aluminum support for a lithographic printing plate used in off-set printing or the like is disclosed, having a surface shape determined using an atomic force microscope (AFM) such that when measured within the measurement range of 100 μm square with the resolution in the horizontal (X, Y) direction being 0.1 μm, assuming that the surface area obtained by an approximate three-point problem is α and the upper projected area is β, the α/β value (specific surface area) is from 1.15 to 1.5, and when measured within the measurement range of 240 μm square with the resolution in the horizontal (X, Y) direction being 1.9 μm, the average surface roughness is from 0.35 to 1.0 μm and the ratio of the sum of the surface area where the gradient of 30° or more to the total surface area is from 5 to 40%.

4 Claims, 1 Drawing Sheet

FIG. 1

ALUMINUM SUPPORT FOR LITHOGRAPHIC PRINTING PLATE

FIELD OF THE INVENTION

The present invention relates to an aluminum support for a lithographic printing plate used in off-set printing or the like.

BACKGROUND OF THE INVENTION

With respect to the aluminum support for a lithographic printing plate, an aluminum support for a lithographic printing plate characterized by the surface shape such that the surface area difference is from 32 to 90% or characterized in that the surface shape in terms of the fractal dimension by a box counting method is from 2.29 to 2.4, has been disclosed (see, JP-A-8-58256 (the term "JP-A" as used herein means an "unexamined published Japanese patent application")).

This conventional technique specifies the representative shape characteristics of an aluminum support having good printing performance, which are, however, insufficient for coupled with production control, constantly producing and providing an aluminum support capable of exhibiting stable capability.

SUMMARY OF THE INVENTION

One object of the present invention is to solve the above-described problem and provide an aluminum support for a lithographic printing plate capable of ensuring stable quality and steady supply, by specifying the measurement method and the evaluation range of the surface shape of the aluminum support so as to obtain a support having good printability and combining the support having good printability under precise judgment with the production control.

The above-described object of the present invention can be attained by an aluminum support for a lithographic printing plate having a surface shape determined using an atomic force microscope (AFM) such that when measured within the measurement range of 100 μm square with the resolution in the horizontal (X, Y) direction being 0.1 μm, assuming that the surface area obtained by an approximate three-point problem is a and the upper projected area is β, the α/β value (specific surface area) is from 1.15 to 1.5, and when measured within the measurement range of 240 μm square with the resolution in the horizontal (X, Y) direction being 1.9 μm, the average surface roughness is from 0.35 to 1.0 μm and the ratio of the sum of the surface area where the gradient of 30° or more to the total surface area is from 5 to 40%.

DETAILED DESCRIPTION OF THE INVENTION

In the present invention, the aluminum support before coating a light-sensitive layer thereon preferably has a 85° glossiness defined in JIS Z9741-1983, of 30 or less. If the glossiness exceeds 30, the amount of fountain solution on the printing machine is difficult to see.

In a preferred embodiment of the aluminum support for a lithographic printing plate, when the support is observed through a scanning type electron microscope at a magnification of 750 times, honeycomb pits having an average diameter of from 0.5 to 20 μm occupy the field of view of 80 μm at an area ratio of from 30 to 100%.

More preferably, the portion where honeycomb pits or crater pits having an average pit size of from 0.5 to 3 μm are produced, occupy from 30 to 100% of the total surface area when observed through a scanning type electron microscope. If the ratio of the portion is less than 30, the surface quality of the printing plate formed from the support is bad and the correction work becomes hard.

The area of the portion where honeycomb pits or crater pits are produced is obtained as follows:

(1) take an SEM photograph at a magnification of 1,500 times, of a sample through a scanning type electron microscope from the site right above the sample;

(2) obtain a 200% enlarged copy of the photograph in Pictrography manufactured by Fuji Photo Film Co., Ltd.;

(3) superpose a transparent PET sheet on the image of the 200% enlarged copy and manually black out the portion where pits are produced; and (4) take in the image on the PET sheet by a flatbed scanner, apply binary code process to the image at a photo shop on Macintosh, and calculate the blacked portion.

The average surface roughness calculated based on the three-dimensional surface shape measured by AFM, the specific surface area and the ratio of the sum of the surface area where a gradient of 30° or more to the total surface area referred to in the present invention participate in the blanket scumming performance (blanket scumming), the difficulty in scumming on the halftone non-image area (difficulty in fill-in) and the press life, in a trade-off relation with each other, and preferably fall within the above-described range.

When measured within the measurement range of 100 μm square using an AFM having resolution in the horizontal (X, Y) direction of 0.1 μm, assuming that the surface area obtained by an approximate three-point problem is α and the upper projected area is β, the α/β value (specific surface area) is from 1.15 to 1.50, preferably 1.15 to 1.30. If the value is less than 1.15, adhesion between the photosensitive layer and the support becomes poor (inferior in press life), whereas if it exceeds 1.50, the blanket scumming performance becomes bad.

When measured within the measurement range of 240 μm square using an AFM having resolution in the horizontal (X, Y) direction of 1.9 μm, the average surface roughness is from 0.35 to 1.0 μm, preferably from 0.35 to 0.8 μm. If the average surface roughness is less than 0.35 μm, scumming is readily generated on the halftone non-image area, whereas if it exceeds 1.0 μm, the non-image area on the blanket is liable to be scummed.

When measured within the measurement range of 240 μm square using an AFM having resolution in the horizontal (X, Y) direction of 1.9 μm, the ratio of the gradient of 30° or more is from 5 to 40%. If the ratio of gradient of 30° or more is less than 5%, the halftone non-image area is readily scummed, whereas if it exceeds 40%, the non-image area on the blanket is liable to be scummed.

The fractal dimension showing the preferred surface embodiment of the present invention, which is obtained by a box counting method, a scale conversion method, a cover method, a turning radius method or a density correlation function method using an AFM having resolution in the horizontal (X, Y) direction of 0.1 μm or 1.9 μm and measuring within the measurement range of 100 μm square or 240 μm square, is from 2.1 to 2.5.

The atomic force microscope (AFM) used in the measurement of the present invention is SPI3700 manufactured by Seiko Instruments Inc. and in the measurement, an aluminum plate cut into a size of 1 cm square is set to a horizontal feed- shelf on a piezo-scanner, a cantilever is moved to approach the sample surface, and when it reaches the region where the atomic force acts, the sample is scanned in the XY direction. At this time, the unevenness of the sample is read as piezo displacement in the Z direction. The piezo-scanner used can scan 150 μm in the XY direction and 10 μm in the Z direction. The cantilever is SI-DF20 manufactured by NANOPROBE and has a resonance frequency of from 120 to 150 kHz and a spring constant of 12 to 20 N/m, and the measurement is performed in a DFM mode (dynamic force 00). The three-dimensional data obtained is approximated by at least 2 square to correct the slight gradient of the sample to thereby obtain the datum level.

When the measurement is performed with the resolution in the XY direction of 1.9 μm, 240 μm square (4 fields of view in 120 μm square) is measured, and at this time, the resolution in the Z direction is 1 nm and the scanning speed is 60 μm/sec.

When the measurement is performed with the resolution in the XY direction of 0.1 μm, 100 μm square (4 fields of view in 50 μm square) is measured, and at this time, the resolution in the Z direction is 1 nm and the scanning speed is 25 μm/sec.

The large wave pitch is calculated by the frequency analysis of the three-dimensional data.

The average surface roughness is obtained by expanding the center line average roughness Ra defined in JIS B0601-94 to three dimensions.

The surface gradient is determined in such a manner that three points adjacent to each other are extracted from the three-dimensional data, all data on the angles crossed by the small triangle formed by the three points with the datum level are calculated, the gradient distribution curve is obtained therefrom, and the ratio of the sum of the surface area where the gradient of 30° or more to the total surface area is calculated.

The medium wave pit size is calculated from the upper projected area S surrounded by the edges of the pit according to $2\cdot(S/\pi)^{1/2}$.

The surface area is obtained from the sum of the areas of small triangles formed by three points adjacent to each other which are extracted from the three-dimensional data.

The present invention is formed into a lithographic printing plate having excellent printing capability by subjected it to coating and drying of a photosensitive layer or an interlayer and a photosensitive layer according to a usual method. On the photosensitive layer, a matting layer may be provided by a conventional method. Further, a back coat layer may be provided on the back surface of the support for the purpose of preventing dissolving out of aluminum upon development. The present invention may not only be formed into a one surface treated lithographic printing plate but also into a double surface treated lithographic printing plate.

The conditions for the aluminum support for a lithographic printing plate according to the present invention may be applied not only to the roughening of the aluminum support for a lithographic printing plate but also to the roughening of all aluminum plates.

The apparatus for use in the present invention may be any known apparatus used in the continuous surface treatment of a metal web.

The aluminum plate for use in the present invention is selected from the group consisting of a pure aluminum plate, an alloy sheet mainly comprising aluminum and containing a trace amount of different elements, and a plastic film having laminated or evaporated thereon aluminum. Examples of the different element contained in the aluminum alloy include silicon, iron, nickel, manganese, copper, magnesium, chromium, zinc, bismuth, titanium and vanadium. Usually, conventionally known materials described in *Aluminum Handbook*, 4th ed. Keikinzoku Kyokai (1990), for example, JIS A 1050, JIS A 3103, JIS A 3005, JIS A 1100 and JIS A 3004 materials and alloys obtained by adding 5 wt % or less of magnesium to these materials for the purpose of increasing the tensile strength can be used. Further, an aluminum plate obtained by omitting intermediate annealing or soaking in the production method of the aluminum plate can also be used. The final rolling may be either plain finish or mill finish.

The above-described aluminum plate may be produced by a usual DC casting method or may be produced by a continuous cast-rolling method. The continuous cast-rolling method may use a twin roller method, a belt caster method or a block caster method. The aluminum plate used in the present invention has a thickness of approximately from 0.1 to 0.6 mm.

The surface roughening treatment method for forming the surface shape of the present invention is described in sequence below.

Embodiment 1:
(a) Mechanical surface roughening treatment

This treatment is applied for the purpose of giving an average surface roughness of from 0.35 to 1.0 μm on measurement through an atomic force microscope, where an aluminum plate surface is subjected to mechanical surface roughening method described in JP-A-6-135175 and JP-B-50-40047 (the term "JP-B" as used herein means an "examined Japanese patent publication"). The treatment is preferably performed before the electropolishing treatment in the first stage. The mechanical surface roughening treatment is preferably performed using a rotating nylon brush roller having a bristle size of from 0.2 to 0.9 mm and feeding a slurry solution to the aluminum plate surface. Needless to say, a method of spraying a slurry solution, a method using a wire brush or a method of transferring the uneven surface shape of the rolling roller to the aluminum plate may also be used. The abrasive may be a known material, however, quartz sand, quartz, aluminum hydroxide and a mixture thereof are preferred.

(b) Electropolishing treatment in acidic aqueous solution or chemical etching treatment in acid or alkali aqueous solution This treatment is applied for the purpose of dissolving the edge part of unevenness produced by the mechanical surface roughening in item (a) above to obtain a surface having smooth waviness, whereby a printing plate having good stain performance can be obtained. At this time, the amount of the aluminum plate dissolved is preferably from 5 to 20 g/m².

(c) Electrochemical surface roughening treatment in aqueous solution mainly comprising nitric acid or hydrochloric acid using DC or AC This treatment is applied for the purpose of producing crater or honeycomb pits having an average diameter of approximately from 0.5 to 20 μm on the aluminum surface at an area ratio of from 30 to 100%, whereby the aluminum plate surface measured through an atomic force microscope can have an average surface roughness of from 0.35 to 1.0 μm. This treatment provides an effect of improving the resistance to scumming and the impression capacity of the printing plate.

(d) Electropolishing treatment in acidic aqueous solution or chemical etching treatment in acid or alkali aqueous solution This treatment is applied for the purpose of removing the smut component mainly comprising aluminum hydroxide produced on the electrochemical surface roughening using AC in item (c) above and smoothing the edge parts of pits produced, whereby the printing plate formed therefrom can have good stain performance. The amount of the aluminum plate dissolved is preferably from 0.05 to 5 $g/m^2$, more preferably from 0.1 to 3 $g/m^2$.

(e) Anodic oxidation treatment

The anodic oxidation treatment is applied so as to increase the abrasion resistance on the surface of the aluminum plate.

(Embodiment 2)

(a) Electropolishing treatment in acidic aqueous solution or chemical etching treatment in acid or alkali aqueous solution This treatment is applied for the purpose of removing rolling oil, natural oxide film or scum present on the aluminum plate and uniformly performing the electrochemical surface roughening. The amount of the aluminum plate dissolved is preferably from 1 to 30 $g/m^2$, more preferably from 1.5 to 20 $g/m^2$.

(b) Electrochemical surface roughening treatment in aqueous solution mainly comprising nitric acid or hydrochloric acid using DC or AC This treatment is applied for the purpose of producing crater or honeycomb pits having an average diameter of approximately from 0.5 to 20 $\mu$m on the aluminum surface at an area ratio of from 30 to 100%, whereby the aluminum plate surface measured through an atomic force microscope can have an average surface roughness of from 0.35 to 1.0 $\mu$m. This treatment provides an effect of improving the reluctance to scumming on the non-image area and the impression capacity of the printing plate.

(c) Electropolishing treatment in acidic aqueous solution or chemical etching treatment in acid or alkali aqueous solution This treatment is applied for the purpose of dissolving the smut produced on the electrochemical roughening in item (b) above as well as the edge parts of pits or the plateaux where pits are not produced, thereby obtaining a surface having smooth unevenness. This treatment provides an effect of improving the reluctance to scumming on the non-image area and the impression capacity of the printing plate. The amount of the aluminum plate dissolved is preferably from 1 to 30 $g/m^2$, more preferably from 1.5 to 20 $g/m^2$.

(d) Electrochemical surface roughening treatment in aqueous solution mainly comprising nitric acid or hydrochloric acid using DC or AC This treatment is applied for the purpose of producing crater or honeycomb pits having an average diameter of approximately from 0.5 to 20 $\mu$m on the aluminum surface at an area ratio of from 30 to 100%. This treatment provides an effect of improving the reluctance to scumming on the non-image area and the impression capacity of the printing plate.

(e) Electropolishing treatment in acidic aqueous solution or chemical etching treatment in acid or alkali aqueous solution This treatment is applied for the purpose of removing the smut component mainly comprising aluminum hydroxide produced on the electrochemical surface roughening using AC in item (d) above and smoothing the edge parts of pits produced, whereby the printing plate formed therefrom can have good stain performance. The amount of the aluminum plate dissolved is preferably from 0.05 to 5 $g/m^2$, more preferably from 0.1 to 3 $g/m^2$.

(f) Anodic oxidation treatment

The anodic oxidation treatment is applied so as to increase the abrasion resistance on the surface of the aluminum plate.

(Embodiment 3)

(a) Electropolishing treatment in acidic aqueous solution or chemical etching treatment in acid or alkali aqueous solution This treatment is applied for the purpose of removing rolling oil, natural oxide film or scum present on the aluminum plate and uniformly performing the electrochemical roughening. The amount of the aluminum plate dissolved is preferably from 1 to 30 $g/m^2$, more preferably from 1.5 to 20 $g/m^2$.

(b) Electrochemical surface roughening treatment in aqueous solution mainly comprising nitric acid or hydrochloric acid using DC or AC The electrochemical surface roughening treatment in an aqueous solution mainly comprising nitric acid or hydrochloric acid using DC or AC is applied for the purpose of producing crater or honeycomb pits having an average diameter of approximately from 0.5 to 20 $\mu$m on the aluminum surface at an area ratio of from 30 to 100%, whereby the aluminum plate surface measured through an atomic force microscope can have an average surface roughness of from 0.35 to 1.0 $\mu$m. This treatment provides an effect of improving the reluctance to scumming on the non-image area and the impression capacity of the printing plate.

(c) Electropolishing treatment in acidic aqueous solution or chemical etching treatment in acid or alkali aqueous solution This treatment is applied for the purpose of removing the smut component mainly comprising aluminum hydroxide produced on the electrochemical surface roughening using AC or DC in item (b) above and smoothing the edge parts of pits produced, whereby the printing plate formed therefrom can have good stain performance on the non-image area. The amount of the aluminum plate dissolved is preferably from 0.05 to 5 $g/m^2$, more preferably from 0.1 to 3 $g/m^2$.

(d) Anodic oxidation treatment

The anodic oxidation treatment is applied so as to increase the abrasion resistance on the surface of the aluminum plate.

Respective items in the above-described embodiments are described in more detail below.

Electropolishing treatment of aluminum plate in acidic aqueous solution or chemical etching treatment of aluminum plate in acid or alkali aqueous solution:

(1) Electropolishing treatment of aluminum plate in acidic aqueous solution

Formulation examples of the electropolishing treatment are described in Fujio Mamiya, *Senjo Sekkei* (*Cleaning Design*) No. 21, pp. 65–72 (1984), classified by respective materials.

The aqueous solution may be a known aqueous solution for use in electropolishing but it is preferably an aqueous solution mainly comprising sulfuric acid or phosphoric acid, more preferably an aqueous solution mainly comprising phosphoric acid.

The phosphoric acid concentration is from 20 to 90 wt % (preferably from 40 to 80 wt %), the liquid temperature is from 10° to 90° C. (preferably from 50° to 80° C.), the current density is from 1 to 100 A/dm² (preferably from 5 to 80 A/dm²), and the electrolysis time is from 1 to 180 seconds.

The aqueous phosphoric acid solution may contain sulfuric acid, chromic acid, hydrogen peroxide, citric acid, boric acid, hydrofluoric acid or phthalic anhydride in an amount of from 1 to 50 wt %. The aqueous solution may of course contain aluminum or may contain from 0 to 10 wt % of an alloy component contained in the aluminum alloy.

The current which can be used may be DC, pulse DC or AC, but continuous DC is preferred.

In the present invention, a known electrolysis treatment apparatus used in electrolysis may be used, such as a flat-type cell or a radial-type cell. The current may be either a parallel flow with or a counter flow to the aluminum plate and is from 0.01 to 10,000 cm/min.

The distance between the aluminum plate and the electrode is preferably from 0.3 to 10 cm, more preferably from 0.8 to 2 cm.

The power supply method may be either a direct supply method using a conductor roll or an indirect supply method using no conductor roll (liquid supply method).

With respect to the electrode material or structure, a known material or structure used in the electrolysis may be used, however, the cathode material is preferably carbon and the anode material is preferably ferrite, iridium oxide or platinum.

The aluminum plate surface to be treated may be an upper surface, a lower surface or both surfaces.

(2) Chemical etching treatment of aluminum plate in acid or alkali aqueous solution This etching method is described in detail in U.S. Pat. No. 3,834,398 and known means may be used.

With respect to the acid or alkali which can be used in the acidic aqueous solution, those described in JP-A-57-16918 may be used individually or in combination. The treatment is preferably performed at a liquid temperature of from 40° to 90° C. for from 1 to 120 seconds.

The concentration of the acidic aqueous solution is preferably from 0.5 to 25 wt %, and the concentration of aluminum dissolved in the acidic aqueous solution is preferably from 0.5 to 5 wt %.

The concentration of the alkali aqueous solution is preferably from 5 to 30 wt %, and the concentration of aluminum dissolved in the alkali aqueous solution is preferably from 1 to 30 wt %.

After completion of the etching treatment, squeezing of solution through nip rollers and water washing by means of a spray are preferably performed so as not to carry over the processing solution to the next step.

When the chemical etching is performed using an aqueous solution of a base, smut is generally produced on the aluminum surface. In this case, the aluminum is treated with phosphoric acid, nitric acid, sulfuric acid, chromic acid, hydrochloric acid or a mixed acid containing two or more of these acids. In the acidic aqueous solution, from 0 to 5 wt % of aluminum may be dissolved.

The treatment is performed at a liquid temperature of from ordinary temperature to 70° C. for a processing time of preferably from 1 to 30 seconds.

After completion of desmutting treatment, squeezing of solution through nip rollers and water washing by means of a spray are preferably performed so as not to carry over the processing solution to the next step.

Also, an overflow waste solution of the electrolytic solution used in the electrochemical surface roughening treatment may be used. In the case where an overflow waste solution of the electrolytic solution used in the electrochemical surface roughening treatment is used, the water washing after desmutting may be omitted, however, it is necessary to take care that the aluminum plate is not dried and the components in the desmutting solution do not precipitate.

Electrochemical surface roughening treatment in aqueous hydrochloric acid or nitric acid solution using DC or AC:

(1) Electrochemical surface roughening using DC

The aqueous solution mainly comprising hydrochloric acid or nitric acid may be one used in usual electrochemical surface roughening using DC or AC. The aqueous solution may be obtained by adding one or more of hydrochloric acid or nitric acid compounds having nitric ion such as aluminum nitrate, sodium nitrate or ammonium nitrate, or hydrochloric ion such as aluminum chloride, sodium chloride or ammonium chloride in an amount of from 1 g/l to saturation, to from 1 to 100 g/l of an aqueous hydrochloric acid or nitric acid solution. In the aqueous solution mainly comprising hydrochloric acid or nitric acid, a metal contained in the aluminum alloy, such as iron, copper, manganese, nickel, titanium, magnesium or silica, may be dissolved. A solution obtained by adding aluminum chloride or aluminum nitrate to an aqueous solution containing from 0.5 to 2 wt % of hydrochloric acid, to have an aluminum ion concentration of from 3 to 50 g/l is preferably used. The temperature is preferably from 10° to 60° C., more preferably from 20° to 50° C.

The treating apparatus for use in the electrochemical surface roughening using DC may be a known apparatus using DC, however, an apparatus where a pair or more of anode and cathode are alternately arranged as described in JP-A-1-141094 is preferably used.

Examples of known apparatuses are described in JP-A6-328876, JP-A-8-670785, JP-A-61-19115 and JP-B-57-44760.

After completion of the electrolysis, squeezing of solution through nip rollers and water washing by means of a spray are preferably performed so as not to carry over the processing solution to the next step.

The DC used in the electrochemical surface roughening is preferably DC having a ripple ratio of 20% or less.

The current density is preferably from 10 to 200 A/dm$^2$, and the quantity of electricity at the anodic time of the aluminum plate is preferably from 100 to 1,000 C/dm$^2$.

The anode may be selected from known electrodes for oxygen generation, such as ferrite, iridium oxide, platinum and platinum cladded or plated to a valve metal such as titanium, niobium or zirconium.

The cathode may be selected from the electrodes used as the cathode of fuel cell, such as carbon, platinum, titanium, niobium, zirconium and stainless steel.

(2) Electrochemical surface roughening using AC

The aqueous solution mainly comprising hydrochloric acid or nitric acid may be one used in usual electrochemical surface roughening using AC. The aqueous solution may be obtained by adding one or more of hydrochloric acid or nitric acid compounds having nitric ion such as aluminum nitrate, sodium nitrate or ammonium nitrate, or hydrochloric ion such as aluminum chloride, sodium chloride or ammonium chloride in an amount of from 1 g/l to saturation, to from 1 to 100 g/l of an aqueous hydrochloric acid or nitric acid solution. In the aqueous solution mainly comprising hydrochloric acid or nitric acid, a metal contained in the aluminum alloy, such as iron, copper, manganese, nickel, titanium, magnesium or silica, may be dissolved. A solution obtained by adding aluminum chloride or aluminum nitrate to an aqueous solution containing from 0.5 to 2 wt % of hydrochloric acid or nitric acid, to have an aluminum ion concentration of from 3 to 50 g/l is preferably used. The temperature is preferably from 10° to 90° C., more preferably from 20° to 80° C.

In the electrochemical surface roughening in an aqueous solution mainly comprising nitric acid, it is preferred that pits having an average diameter of from 0.5 to 3 μm are produced at a ratio of from 1×10$^5$ to 1×10$^6$ pits/mm$^2$. However, when a relatively large quantity of electricity is used, the electrolysis reaction is concentrated and honeycomb pits having a diameter exceeding 3 μm may be produced.

In the electrochemical surface roughening in an aqueous solution mainly comprising hydrochloric acid, cubic pits having a size of from 0.1 to 0.4 μm square are uniformly produced over the entire surface in a multiply manner on the crater or honeycomb large waviness having an average diameter of from 2 to 20 μm. The crater pits are preferably produced at a density of from 500 to 300,000 pits/mm$^2$.

The AC power waveform used in the electrochemical surface roughening includes sine waveform, square waveform, trapezoidal waveform and triangle waveform.

In the electrochemical surface roughening in an aqueous nitric acid solution, square waveform and trapezoidal waveform are preferred, and trapezoidal waveform is more preferred. In the case of trapezoidal waveform, the time TP necessary for the current starting from 0 to reach the peak is preferably from 0.5 to 3 msec.

In the electrochemical surface roughening in an aqueous hydrochloric acid solution, trapezoidal waveform, sine waveform and triangle waveform are preferred, and trapezoidal waveform and triangle waveform are more preferred. In the case of trapezoidal or triangle waveform, the time TP necessary for the current starting from 0 to reach the peak is preferably from 0 to 50%, more preferably from 1 to 30%, still more preferably from 1 to 10%, of the anodic time of the aluminum plate in one cycle of the current waveform.

In the trapezoidal waveform, the time TH where the peak of the current waveform at the anodic time of the aluminum plate is maintained, is preferably from 1 to 50%, more preferably from 1 to 30%, still more preferably from 1 to 10%, of the anodic period of the aluminum plate in one cycle of the current waveform.

The power waveform used in the electrochemical surface roughening in an aqueous solution mainly comprising nitric acid or hydrochloric acid, in any case, preferably has a duty ratio of from 1:2 to 2:1, more preferably 1:1 in view of the cost of the power source body. Frequency of from 0.1 to 120 Hz may be used, however, frequency of from 20 to 70 Hz is preferred in view of equipments.

However, when an aluminum alloy containing Cu in an amount exceeding 0.1 wt % is used in the electrochemical roughening in an aqueous nitric acid solution, the frequency is preferably from 0.1 to 10 Hz, and AC having a frequency of from 0.3 to 1.2 Hz is more preferred.

The current density is, in terms of the peak value of the power waveform, preferably from 10 to 200 A/dm$^2$.

Figure 1:
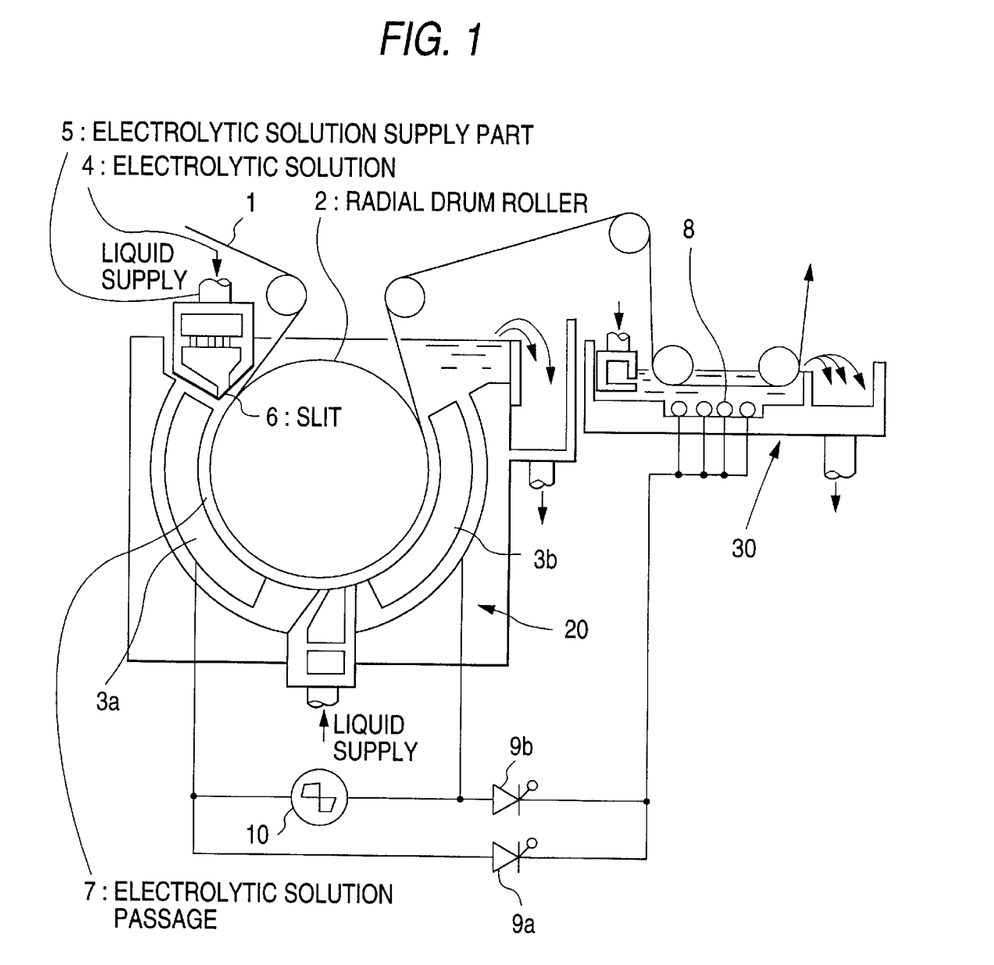
FIG. 1 shows a side view of one example of a radial-type electrolysis apparatus which can perform electrochemical surface roughening using AC to obtain the support of the present invention.

With respect to the electrolytic cell used in the electrochemical surface roughening using AC according to the present invention, known electrolytic cells used in the surface treatment, such as vertical-type cell, flat-type cell nd radial-type cell, may be used, however, the radial-type electrolytic cell as disclosed in JP-A-5-195300 and as shown in FIG. 1 is more preferred. The electrolytic solution passing through the electrolytic cell may flow in parallel with or counter to the proceeding of the aluminum web.

As shown in FIG. 1, one or more AC power source 10 may be connected to the electrolytic cell 20.

It is preferred to control the current ratio between the anode and the cathode of the AC applied to the aluminum web 1 opposing the main electrodes 3a and 3b so as to perform uniform graining and also to provide an auxiliary anode 8 as shown in FIG. 1 and divide the flow of a part of the AC current for the purpose of reducing dissolution of carbon of the main electrodes 3a and 3b. By dividing a part of the current value through rectifying devices 9a and 9b or through a switch element and flowing it as a DC current to an auxiliary anode 8 provided in the auxiliary anode cell 30 separately from two main electrodes, the ratio between the current value participating in the anode reaction acting on the aluminum web opposing the main electrodes and the current value participating in the cathode reaction, may be controlled.

The ratio between the quantity of electricity participating in the anode reaction acting on the aluminum web opposing the main electrodes and the quantity of electricity participating in the cathode reaction is preferably from 0.3 to 0.95.
Anodic oxidation treatment:

The anodic oxidation treatment is applied so as to increase the abrasion resistance on the surface of the aluminum plate. The electrolyte used in the anodic oxidation treatment of the aluminum plate may be any as long as it forms a porous oxide film. In general, sulfuric acid, phosphoric acid, oxalic acid, chromic acid or a mixed solution thereof is used. The concentration of the electrolyte may be appropriately determined depending on the kind of the electrolyte. The treating conditions of the anodic oxidation varies depending on the electrolyte used and cannot be definitely specified, however, it is in general suitable that the concentration of the electrolyte is from 1 to 80 wt %, the liquid temperature is from 5° to 70° C., the current density is from 1 to 60 A/dm$^2$, the voltage is from 1 to 100 V and the electrolysis time is from 10 to 300 seconds.

The sulfuric acid method is usually performed with DC, however, AC also may be used.

The amount of the anodic oxide film is suitably from 1 to 10 g/m$^2$. If it is less than 1 g/m$^2$, the press life is insufficient, the non-image area of the lithographic printing plate is prone to scratching, and at the same time, adhesion of ink to the scratched portion, so-called scratching stain is readily caused.
Hydrophilic treatment after formation of anodized film:

After anodic oxidation treatment is applied, the aluminum surface is subjected to hydrophilic treatment, if desired. The hydrophilic treatment which can be used in the present invention includes an alkali metal silicate (for example, an aqueous sodium silicate solution) method disclosed in U.S. Pat. Nos. 2,714,066, 3,181,461, 3,280,734 and 3,902,734. In this method, the support is soaked or electrolyzed in an aqueous sodium silicate solution. In addition, a method of treating the support with potassium fluorozirconate disclosed in JP-B-36-22063 and a method of treating the support with polyvinylphosphonate disclosed in U.S. Pat. Nos. 3,276,868, 4,153,461 and 4,689,272 may be used.

Further, after graining and anodic oxidation treatments, sealing may be preferably applied. The sealing may be performed by dipping the support in hot water or hot aqueous solution containing an inorganic salt or organic salt or may be performed in a steam bath.

On the thus-obtained support for a lithographic printing plate, a conventionally known photosensitive layer is provided to obtain a photosensitive lithographic printing plate, which is then subjected to plate-making process. The lithographic printing plate obtained has excellent performance. The photosensitive material for use in the photosensitive layer is not particularly limited, and those usually used in the photosensitive lithographic printing plate can be used. For example, various substances described in JP-A-6-135175 may be used.

Before coating a photosensitive layer on the aluminum plate, an organic undercoat layer (interlayer) may be provided, if desired. The organic undercoat layer may be an undercoat layer conventionally known and examples thereof are described in JP-A-9-135175. The photosensitive layer may be either negative or positive.

EXAMPLE 1

JIS 1050 aluminum plate having a thickness of 0.3 mm and a width of 1,030 mm prepared by a continuous casting method was successively subjected to the following treatments.

(a) The surface of the aluminum plate was mechanically roughened by means of a rotating roller nylon brush while feeding a suspension of an abrasive (aluminum hydroxide) in water, having a specific gravity of 1.12 as an abrasive slurry solution to the surface of the aluminum plate. The nylon brush was formed of 6·10 nylon and has a bristle length of 50 mm and a bristle diameter as shown in Table 1. The nylon brush was obtained by fastening bristles in groups to the hole punched on a stainless steel-made cylinder having a diameter ($\phi$) of 300 mm. Three rotating brushes were used. At the lower portion of each brush, two holding rollers (200 mm$\phi$) were provided at a distance of 300 mm. The brush rollers were impressed until the load of the drive motor for rotating the brush reached +7 kw based on the load before the brush rollers were impressed to the aluminum plate. The brush was rotated in the same direction as the direction in which the aluminum plate was moving.

(b) The aluminum plate was etched by spraying a solution having a caustic soda concentration of 26 wt % and an aluminum ion concentration of 6.5 wt % at a liquid temperature of 75° C. to dissolve 15 g/m$^2$ of the aluminum plate, followed by spray washing with water.

(c) The aluminum plate was desmutted by spraying an aqueous solution (containing 0.5 wt % of aluminum ion) having a nitric acid concentration of 1 wt % at a liquid temperature of 30° C., followed by spray washing with water. The aqueous nitric acid solution used in the desmutting was a waste solution brought on in the process of electrochemical surface roughening in an aqueous nitric acid solution using AC.

(d) The aluminum support was subjected to continuous electrochemical surface roughening using a triangle waveform AC having a frequency of 60 Hz. The electrolytic solution used was a nitric acid 1 wt % aqueous solution (containing 0.5 wt % of aluminum ion and 0.007 wt % of ammonium ion) at a liquid temperature of 35° C. The AC power waveform was a trapezoidal square waveform AC having a time TP necessary for the current value starting from 0 to reach the peak, of 2 msec and a duty ratio of 1:1, and the counter electrode was carbon electrode.

The quantity of electricity was as shown in Table 1 in terms of the total quantity of electricity in the period where the aluminum plate was anodic. Thereafter, the aluminum plate was washed with water by means of a spray.

(e) The aluminum plate was etched by spraying a solution having a caustic soda concentration of 26 wt % and an aluminum ion concentration of 6.5 wt %. At this time, the aluminum plate was dissolved in an amount shown in Table 1, the smut component mainly comprising aluminum hydroxide produced in the electrochemical surface roughening using AC in the previous stage was removed, and the edge parts of pits produced were dissolved to smooth the edge parts. Thereafter, the aluminum plate was washed with water by means of a spray.

(f) The aluminum plate was desmutted by spraying an aqueous solution having a sulfuric acid concentration of 25 wt % (containing 0.5 wt % of aluminum ion) at a liquid temperature of 60° C. Thereafter, the aluminum plate was washed with water by means of a spray.

(g) The aluminum plate was subjected to anodic oxidation in an aqueous solution having a sulfuric acid concentration of 15 wt % (containing 0.5 wt % of aluminum ion) at a liquid temperature of 35° C. using a DC voltage at a current density of 2 A/dm$^2$ to have an amount of anodized film of 2.4 g/m$^2$. Thereafter, the aluminum plate was washed with water by means of a spray.

The surface of each aluminum plate thus treated was observed through FESEM manufactured by Hitachi, Ltd. and then, it was found that honeycomb pits having an average diameter of from 0.5 to 3.0 $\mu$m were produced in a multiply manner over a large waviness of from 5 to 30 $\mu$m. The ratio of the area where pits having an average diameter of from 0.5 to 3.0 $\mu$m were produced was as shown in Table 1. The 850 glossiness was as shown in Table 1 below.

The average surface roughness, the surface gradient distribution and the specific surface area obtained by an atomic force microscope are shown in Table 1.

On the thus-obtained aluminum plate, an interlayer and a photosensitive layer were coated and dried to prepare a negative lithographic printing plate having a dry thickness of 2.0 g/m$^2$. Using each lithographic printing plate, printing was performed and the evaluation results obtained are shown in Table 1 below.

Further, evaluation methods are as follows.

(1) Scumming on halftone non-image area

Scumming reduction of the halftone non-image area of the lithographic printing plates was observed and evaluated with visual evaluation.

(2) Scumming on blanket

Scumming reduction of the non-ink transfer part of the blanket cylinder in a printing apparatus was observed and evaluated with visual evaluation.

(3) Easiness to see fountain solution

Easiness to see the status of fountain solution on the lithographic printing plates set on the plate cylinder in a printing apparatus was observed and evaluated with visual evaluation.

(4) Integrated evaluation

The above (1) to (3) were integratedly evaluated.

TABLE 1

|  |  |  | Example | | | | | | |
| --- | --- | --- | --- | --- | --- | --- | --- | --- | --- |
|  |  |  | 1-1 | 1-2 | 1-3 | 1-4 | 1-5 | 1-6 | 1-7 |
| (a) | mechanical surface roughening | brush bristle size | 0.3 | 0.48 | 0.72 | 0.48 | 0.48 | 0.48 | 0.48 |
| (b) | chemical etching | dissolved amount g/m$^2$ | 15 | 15 | 15 | 15 | 15 | 15 | 15 |
| (c) | desmutting | soaked time sec | 10 | 10 | 10 | 10 | 10 | 10 | 10 |
| (d) | electrochemical surface roughening | quantity of electricity c/dm$^2$ | 280 | 280 | 280 | 280 | 280 | 180 | 230 |
|  |  | liquid temperature °C. | 35 | 35 | 35 | 35 | 35 | 35 | 35 |
| (e) | chemical etching | dissolved amount g/m$^2$ | 1.1 | 1.1 | 1.1 | 0.8 | 1.3 | 1.1 | 1.1 |

TABLE 1-continued

|  |  |  | Example | | | | | | |
|---|---|---|---|---|---|---|---|---|---|
|  |  |  | 1-1 | 1-2 | 1-3 | 1-4 | 1-5 | 1-6 | 1-7 |
| (f) | desmutting | soaked time sec | 10 | 10 | 10 | 10 | 10 | 10 | 10 |
| (g) | anodic oxidation | film amount g/m$^2$ | 2.4 | 2.4 | 2.4 | 2.4 | 2.4 | 2.4 | 2.4 |
| Physical properties | AFM measurement (resolution: 1.9 μm) | average surface roughness μm | 0.46 | 0.62 | 0.76 | 0.64 | 0.6 | 0.65 | 0.61 |
|  |  | surface gradient distribution a30 % | 7.5 | 9.8 | 10.8 | 11.2 | 6.8 | 16.3 | 12.6 |
|  | AFM measurement (resolution: 0.1 μm) | specific surface area | 1.2 | 1.22 | 1.24 | 1.32 | 1.17 | 1.28 | 1.23 |
|  | 85° glossiness |  | 20 | 15 | 13 | 18 | 18 | 17 | 18 |
|  | ratio of area where honeycomb pits having a diameter of 0.5 to 3 μm are produced |  | 95 | 95 | 95 | 95 | 95 | 50 | 70 |
|  | average honeycomb pit size |  | 0.5–3 | 0.5–3 | 0.5–3 | 0.5–3 | 0.5–3 | 0.5–3 | 0.5–3 |
| Printing evaluation | scumming reduction | halftone non-image area | A–B | A | A | A | A | A | A |
|  |  | on blanket | A | A | A–B | A | A | A | A |
|  | easiness to see fountain solution |  | A | A | A | A | A | A | A |
|  | integrated evaluation |  | A–B | A | A–B | A | A | A–B | A–B |

Evaluation: A: excellent B: good C: practical

Preferred are Level A and Level B.

EXAMPLE 2

Aluminum plates were subjected to the surface treatment thoroughly under the same conditions as in Example 1—1, 1-2 or 1-3 except that the aluminum plate was soaked in an aqueous sodium silicate solution after the anodic oxidation (g). On each of the thus-treated aluminum plates, an interlayer and a negative photosensitive layer were coated and dried to prepare a lithographic printing plate. The lithographic printing plates each was subjected to printing and revealed to be a good printing plate.

EXAMPLE 3

JIS 1050 aluminum plate having a thickness of 0.24 mm and a width of 1,030 mm was subjected to the following treatments.

(a) The aluminum plate was etched by spraying a solution having a caustic soda concentration of 26 wt % and an aluminum ion concentration of 6.5 wt % at a liquid temperature of 75° C. At this time, the aluminum plate was dissolved in an amount of 6.0 g/m$^2$, and the rolling oil or natural oxide film were removed. Thereafter, the aluminum plate was washed with water by means of a spray.

(b) The aluminum plate was desmutted by spraying an aqueous solution having a nitric acid concentration of 1 wt % (containing 0.5 wt % of aluminum ion) at a liquid temperature of 30° C. Thereafter, the aluminum plate was washed with water by means of a spray. The aqueous nitric acid solution used in the desmutting was a waste solution brought on in the process of electrochemical surface roughening in an aqueous nitric acid solution using DC.

(c) The aluminum support was subjected to continuous electrochemical surface roughening using a DC voltage, where an anode and a cathode were disposed alternately in the electrolytic solution and the aluminum plate was travelled while keeping a constant distance from the anode and the cathode to which a DC power was connected. The electrolytic solution used was a nitric acid 1 wt % aqueous solution (containing 0.5 wt % of aluminum ion and 0.007 wt % of ammonium ion) at a liquid temperature of 45° C. The anode was ferrite and the cathode was titanium. The electrolysis was performed using a DC voltage having a ripple ratio of 20% or less. The current density was 50 A/dm$^2$ and the quantity of electricity at the anodic time of the aluminum plate was 400 C/dm$^2$.

(d) The aluminum plate was etched by spraying a solution having a caustic soda concentration of 26 wt % and an aluminum ion concentration of 6.5 wt % at a liquid temperature of 75° C. to dissolve 5 g/m$^2$ of the aluminum plate. Thereafter, the aluminum plate was washed with water by means of a spray.

(e) The aluminum plate was desmutted by spraying an aqueous solution having a nitric acid concentration of 1 wt % (containing 0.5 wt % of aluminum ion) at a liquid temperature of 30° C. Thereafter, the aluminum plate was washed with water by means of a spray. The aqueous nitric acid solution used in the desmutting was a waste solution brought on in the process of electrochemical surface roughening in an aqueous nitric acid solution using DC.

(f) The aluminum support was subjected to continuous electrochemical surface roughening using an AC voltage of 60 Hz. The electrolytic solution used was a nitric acid 1 wt % aqueous solution (containing 0.5 wt % of aluminum ion and 0.007 wt % of ammonium ion) at a liquid temperature of 20°, 35° or 45° C. The AC power waveform was a trapezoidal square waveform AC having a time TP necessary for the current value starting from 0 to reach the peak, of 1.0 msec and a duty ratio of 1:1, and the counter electrode was carbon electrode.

The quantity of electricity in terms of the total quantity of electricity in the anodic time of the aluminum plate was 130 C/dm$^2$. Thereafter, the aluminum plate was washed with water by means of a spray.

(g) The aluminum plate was etched by spraying a solution having a caustic soda concentration of 5 wt % and an aluminum ion concentration of 0.5 wt %. At this time, the aluminum plate was dissolved in an amount of 0.1 g/m$^2$, the smut component mainly comprising aluminum hydroxide produced in the electrochemical surface roughening using AC in the previous stage was removed, and the edge parts of pits produced were dissolved to smooth the edge parts. Thereafter, the aluminum plate was washed with water by means of a spray.

(h) The aluminum plate was desmutted by spraying an aqueous solution having a sulfuric acid concentration of 25 wt % (containing 0.5 wt % of aluminum ion) at a liquid temperature of 60° C. Thereafter, the aluminum plate was washed with water by means of a spray.

(i) The aluminum plate was subjected to anodic oxidation in an aqueous solution having a sulfuric acid concentration of 15 wt % (containing 0.5 wt % of aluminum ion) at a liquid temperature of 35° C. using a DC voltage at a current density of 2 A/dm$^2$ to have an amount of anodic oxide film of 2.4 g/m$^2$. Thereafter, the aluminum plate was washed with water by means of a spray.

(j) For the purpose of subjecting the aluminum plate to hydrophilic treatment, the plate was soaked in an aqueous solution containing 2.5 wt % of sodium silicate for 14 seconds at 70° C. Thereafter, the aluminum plate was washed with water by means of a spray and dried. After each treatment and water washing, the solution was squeezed through nip rollers.

The surface of each aluminum plate thus treated was observed through FESEM manufactured by Hitachi, Ltd. and then, it was found that honeycomb pits having an average diameter of from 0.5 to 3 $\mu$m were produced in a multiple manner over a large waviness of from 5 to 30 $\mu$m.

The ratio of the area where pits having an average diameter of from 0.5 to 3.0 $\mu$m were produced was 50%. The 85° glossiness was 12.

The average surface roughness obtained by AFM having resolution of 1.9 $\mu$m was 0.6 $\mu$m, the surface gradient distribution was 10%, and the specific surface area obtained by AFM having resolution of 0.1 $\mu$m was 1.30.

On each of the thus-treated aluminum plates, an interlayer and a photosensitive layer were coated and dried to prepare a negative lithographic printing plate having a dry thickness of 2.0 g/m$^2$. The lithographic printing plates each was subjected to printing and revealed to be a good printing plate.

EXAMPLE 4

JIS 3005 aluminum plate having a thickness of 0.24 mm and a width of 1,030 mm was successively subjected to the following treatments.

(a) The aluminum plate was etched by spraying a solution having a caustic soda concentration of 26 wt % and an aluminum ion concentration of 6.5 wt % at a liquid temperature of 75° C. to dissolve the aluminum plate in an amount of 6.0 g/m$^2$. Thereafter, the aluminum plate was washed with water by means of a spray.

(b) The aluminum plate was desmutted by spraying an aqueous solution having a sulfuric acid concentration of 25 wt % (containing 0.5 wt % of aluminum ion) at a liquid temperature of 60° C. Thereafter, the aluminum plate was washed with water by means of a spray.

(c) The aluminum support was subjected to continuous electrochemical surface roughening using a AC voltage of 60 Hz. The electrolytic solution used was a nitric acid 1 wt % aqueous solution (containing 0.5 wt % of aluminum ion and 0.007 wt % of ammonium ion) at a liquid temperature of 45° C. The AC power waveform was a trapezoidal square waveform AC having a time TP necessary for the current value starting from 0 to reach the peak, of 2 msec and a duty ratio of 1:1, and the counter electrode was carbon electrode. The auxiliary anode was ferrite.

The current density in terms of the current peak value was 60 A/dm$^2$ and the quantity of electricity at the anodic time of the aluminum plate was 276 C/dm$^2$. The current flown from the power source was divided by 10% into the auxiliary anode.

Thereafter, the aluminum plate was washed with water by means of a spray.

(d) The aluminum plate was etched by spraying a solution having a caustic soda concentration of 5 wt % and an aluminum ion concentration of 0.5 wt %. At this time, the aluminum plate was dissolved in an amount of 0.1 g/m$^2$, the smut component mainly comprising aluminum hydroxide produced in the electrochemical surface roughening using AC in the previous stage was removed, and the edge parts of pits produced were dissolved to smooth the edge parts. Thereafter, the aluminum plate was washed with water by means of a spray.

(e) The aluminum plate was desmutted by spraying an aqueous solution having a sulfuric acid concentration of 25 wt % (containing 0.5 wt % of aluminum ion) at a liquid temperature of 60° C. Thereafter, the aluminum plate was washed with water by means of a spray.

(f) The aluminum plate was subjected to anodic oxidation in an aqueous solution having a sulfuric acid concentration of 15 wt % (containing 0.5 wt % of aluminum ion) at a liquid temperature of 35° C. using a DC voltage at a current density of 2 A/dm$^2$ to have an amount of anodized film of 2.4 g/m$^2$. Thereafter, the aluminum plate was washed with water by means of a spray.

(g) For the purpose of subjecting the aluminum plate to hydrophilic treatment, the plate was soaked in an aqueous solution containing 2.5 wt % of sodium silicate for 14 seconds at 70° C. Thereafter, the aluminum plate was washed with water by means of a spray and dried. After each treatment and water washing, the solution was squeezed through nip rollers.

The surface of the aluminum plate thus treated was observed through FESEM manufactured by Hitachi, Ltd. and then, it was found that honeycomb-pits having an average diameter of from 0.5 to 3 $\mu$m were produced in a multiply manner over a large waviness of from 5 to 30 $\mu$m.

The ratio of the area where pits having an average diameter of from 0.5 to 3.0 $\mu$m were produced was 95%.

The 85° glossiness was 28.

The average surface roughness obtained by AFM having resolution of 1.9 $\mu$m was 0.45 $\mu$m, the ratio of the surface gradient of 30° or more in the distribution was from 5 to 40%, and the specific surface area obtained by AFM having resolution of 0.1 $\mu$m was 1.40. On the thus-treated aluminum plate, an interlayer and a photosensitive layer were coated and dried to prepare a negative lithographic printing plate having a dry thickness of 2.0 g/m$^2$. The lithographic printing plate was subjected to printing and verified to be a good printing plate.

By specifying the characteristics of an aluminum support for a lithographic printing plate having good printing capability using a specific measurement method, a support having good printing capability can be provided and by precisely judging the good support and combining it with the production control, stable quality can be ensured.

Further, even by the electrochemical surface roughening in an acidic aqueous solution using AC, pits having a relatively large size can be produced.

While the invention has been described in detail and with reference to specific embodiments thereof, it will be apparent to one skilled in the art that various changes and modifications can be made therein without departing from the spirit and scope thereof.

What is claimed is:

1. An aluminum support for a lithographic printing plate having a surface shape determined using an atomic force microscope (AFM) such that when measured within the measurement range of 100 μm square with the resolution in the horizontal (X, Y) direction being 0.1 μm, assuming that the surface area obtained by an approximate three-point problem is a and the upper projected area is β, the α/β value (specific surface area) is from 1.15 to 1.5, and when measured within the measurement range of 240 μm square with the resolution in the horizontal (X, Y) direction being 1.9 μm, the average surface roughness is from 0.35 to 1.0 μm and the ratio of the sum of the surface area where the gradient of 30° or more to the total surface area is from 5 to 40%.

2. The aluminum support for a lithographic printing plate as claimed in claim 1, wherein the 85° glossiness according to JIS is 30 or less.

3. The aluminum support for a lithographic printing plate as claimed in claim 2, wherein when the support is observed through a scanning type electron microscope at a magnification of 750 times, honeycomb pits having an average diameter of from 0.5 to 20 μm occupy the field of view of 80 μm at an area ratio of from 30 to 100%.

4. The aluminum support for a lithographic printing plate as claimed in claim 1, wherein when the support is observed through a scanning type electron microscope at a magnification of 750 times, honeycomb pits having an average diameter of from 0.5 to 20 μm occupy the field of view of 80 μm at an area ratio of from 30 to 100%.

* * * * *